UNITED STATES PATENT OFFICE.

GEORGE BROWNEN, OF ALTHORP ROAD, UPPER TOOTING, COUNTY OF SURREY, ENGLAND.

PREPARATION OF EXTRACT OF COCA.

SPECIFICATION forming part of Letters Patent No. 339,262, dated April 6, 1886.

Application filed September 15, 1885. Serial No. 177,190. (No specimens.)

*To all whom it may concern:*

Be it known that I, GEORGE BROWNEN, fellow of the chemical society, of No. 15 Althorp Road, Upper Tooting, in the county of Surrey, England, a subject of the Queen of Great Britain, have invented an Improvement in Beverages Prepared from Extracts of the Leaves of the Coca-Plant; and I do hereby declare that the following is a full, clear, and exact description of the invention, which will enable others skilled in the art to which it appertains to make and use the same.

I take the leaves of the coca-plant (*Erythroxylon coca*) and extract them with a solvent—such as alcohol or water. By preference I use dilute alcohol, so as to obtain in solution the whole of the active constituents of the leaf; or I may take an extract or solution of the coca-leaf as it is to be found in commerce. In either case I proceed to purify the extract or solution in such manner as to get rid of inert or decomposible matter, which if not removed would render a beverage prepared from the extract or solution unstable and liable to decomposition when stored, and which also would cause an unsightly turbidity. I effect this purification by precipitation preferably by the addition of hydrate or carbonate of magnesium, calcium, or aluminium. After vigorous agitation I allow the precipitate to form and subside. I then filter off the purified extract, which, if desired, I concentrate; or I dilute it with water and charge it with carbonic-acid gas, so forming an aerated beverage, which is bottled for the market in the usual way.

I prefer to make my solution direct from the coca-leaf itself, as it enables me to guarantee its strength by a previous assay, as some coca is unsuitable or inert.

I make my fluid extract of coca as follows: One pound of the coca-leaves is reduced to powder and moistened with half a pint of spirit of wine, and, if the previous assay indicates an exceptionally rich or feebly-soluble alkaloidal leaf, I may add (previously dissolved in the spirit of wine) five grains of citric acid. I allow this mixture to macerate for about twenty-four hours. I then pack it in a percolator and displace with more spirit of wine until I have obtained sixteen fluid ounces of percolate. This I remove from the receiver of the percolator, and then proceed to displace the absorbed spirit from the marc by acidulated water. This water is prepared by dissolving four grains of citric acid in a pint of water. When the leaves are exhausted by this process, I concentrate this second percolate at a low temperature to a sirupy consistence and then mix it with a pint of water. To this again I add one hundred and twenty grains or thereabouts of magnesia, or two hundred grains or thereabouts of its carbonate, or a similar proportion of the hydrates or carbonate of calcium or aluminium. I prefer to use magnesia (MgO.) To this mixture I add the first or alcoholic percolate and agitate the mixture violently from time to time. By this method the acid, resin, and tannin are removed from solution in union with the precipitant. After a day or so the extract is deprived of its resin, &c., and the fluid may be decanted or filtered. By this process I obtain a hydro-alcoholic solution of the alkaloids, and essential oil of coca, on which its remedial virtues depend, and the resinous or inert matters, which would render turbid a dilute or aqueous mixture, are separated. This extract I now proceed to mix with water in definite proportions, dependent upon the previous assay, so as to impregnate each bottleful of the water with a medium dose of coca—say equaling two hundred and seventy grains of leaf or 1.2 grain of the alkaloid to one gallon of water. I may add aromatics, if it is so desired, and then I proceed to charge the coca-water with carbonic-acid gas in the ordinary way of aerated waters, and I bottle it and prepare it for sale in the usual manner. Such a solution will fairly represent the beverage coca. It will present it in a convenient form, free from inert or unstable matters, and suitable for storage or immediate use. By the use of this preparation the crude methods of chewing the leaf, making an infusion or tea, which soon becomes very objectionable, or diluting an alcoholic solution, which becomes turbid, unsightly, and deposits, may be dispensed with and a true beverage obtained containing in full the refreshing and sustaining properties of the coca-plant.

I assay the coca-leaf by percolating the powdered leaf with spirit of wine containing one grain of citric acid in every two ounces of the spirit employed, and from the resultant tincture I liberate the alkaloid by magnesia and purify with ether.

Having now particularly described and ascertained the nature of my said invention, and in what manner the same is to be performed, I declare that what I claim is—

1. As an improvement in the process of preparing beverages from extracts of the leaves of the coca-plant, the method of obtaining such extracts in purified condition, consisting in reducing the leaves to powder, macerating with spirit of wine, percolating with additional spirit of wine, removing this alcoholic percolate, displacing the absorbed spirit of wine from the marc by an aqueous solution of citric acid, concentrating this second percolate, mixing it with water, adding to the second percolate the first obtained or alcoholic percolate and a precipitant, (such as magnesia,) agitating the mixture, allowing it to subside, and removing the purified fluid from the precipitate, substantially as set forth.

2. The process described of preparing beverages from extracts of the leaves of the coca-plant, consisting in obtaining the extract, adding to it a precipitant, (such as magnesia,) agitating the mixture, allowing it to subside, removing the thus purified fluid from the precipitate, diluting it, and aerating it, substantially as set forth.

GEORGE BROWNEN.

Witnesses:
 JNO. DEAN,
 HERBERT DALE,
 *Both of* 17 *Gracechurch Street, London.*